United States Patent [19]

Yoneda

[11] 4,180,813

[45] Dec. 25, 1979

[54] LIQUID CRYSTAL DISPLAY DEVICE USING SIGNAL CONVERTER OF DIGITAL TYPE

[75] Inventor: Yutaka Yoneda, Kodaira, Japan

[73] Assignee: Hitachi, Ltd., Japan

[21] Appl. No.: 819,408

[22] Filed: Jul. 26, 1977

[51] Int. Cl.² .............................................. G06K 15/18
[52] U.S. Cl. ..................................... 340/784; 340/800; 350/333; 358/241
[58] Field of Search .......................... 340/324 M, 784; 358/240, 241, 283; 350/333

[56] References Cited

U.S. PATENT DOCUMENTS

| | | | |
|---|---|---|---|
| 3,590,156 | 6/1971 | Easton | 358/240 |
| 3,733,435 | 5/1973 | Chodil et al. | 358/241 X |
| 3,776,615 | 12/1973 | Tsukamoto et al. | 340/324 M |
| 3,838,209 | 9/1974 | Tsuchiya et al. | 358/241 |
| 3,995,939 | 12/1976 | Borel et al. | 340/324 M |
| 4,024,529 | 5/1977 | Sakai | 340/324 M |
| 4,044,345 | 8/1977 | Ueda et al. | 340/784 |

Primary Examiner—David L. Trafton
Attorney, Agent, or Firm—Craig and Antonelli

[57] ABSTRACT

A liquid crystal display device capable of displaying halftone pictures comprises a liquid crystal display panel in which liquid crystal picture elements are provided at the intersections of the m scanning electrodes and the n signal electrodes arranged in matrix configuration so as to be selectively lit up, a first liquid crystal drive circuit for selectively applying scanning voltages to the m scanning electrodes, a second liquid crystal drive circuit for applying brightness signal voltages to the n signal electrodes, wherein the signal converting circuit for supplying the n brightness signal voltages corresponding to the n signal electrodes to the second liquid crystal drive circuit in synchronism with the scanning voltages is simplified by constructing all the component circuits, except the A/D converter, in digital fashion so that it can be easily integrated and that every signal electrode need not be provided with a brightness control circuit.

3 Claims, 19 Drawing Figures

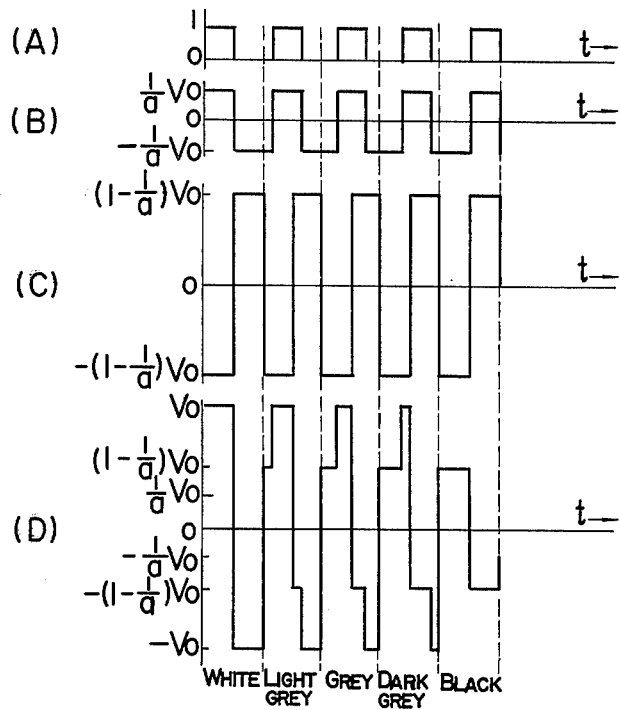
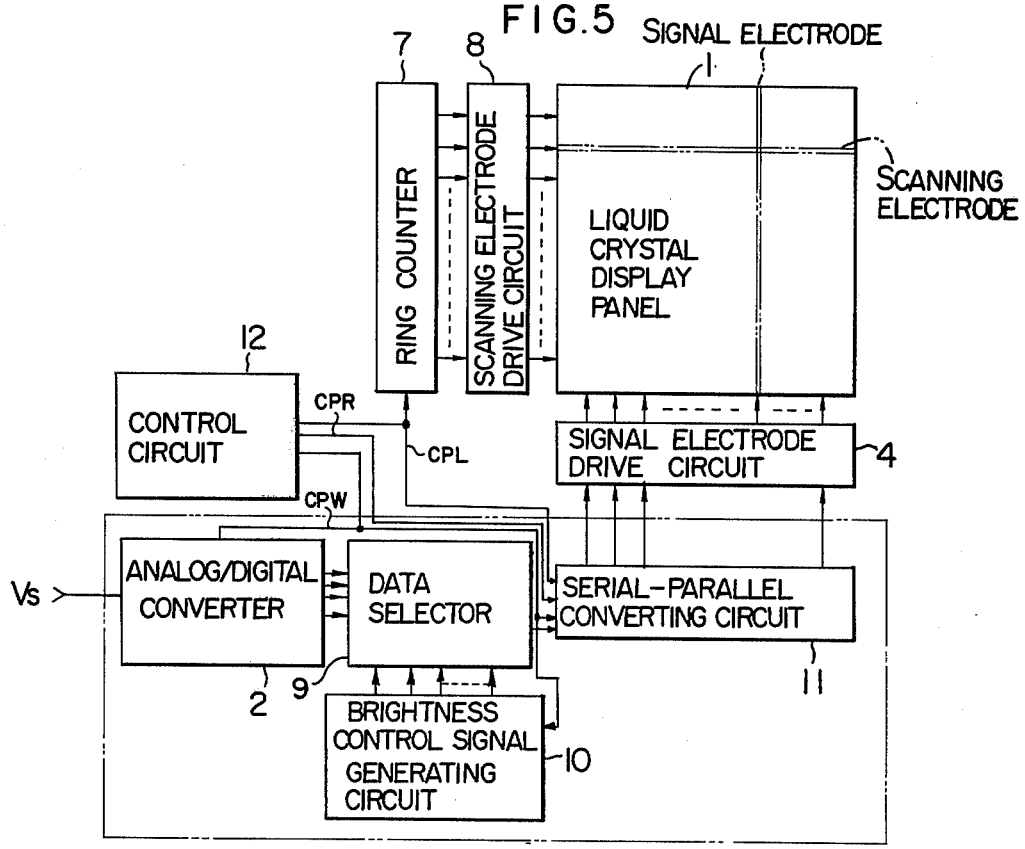

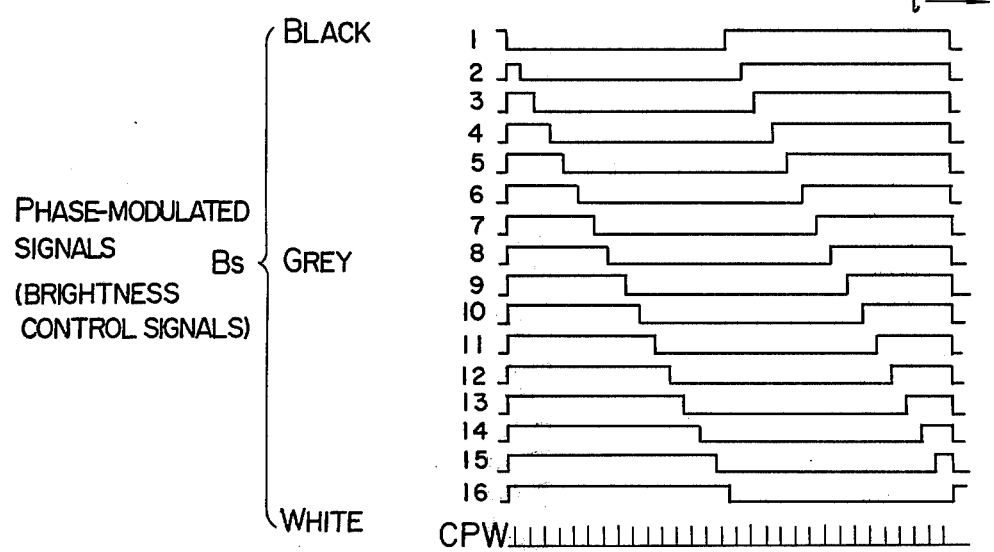
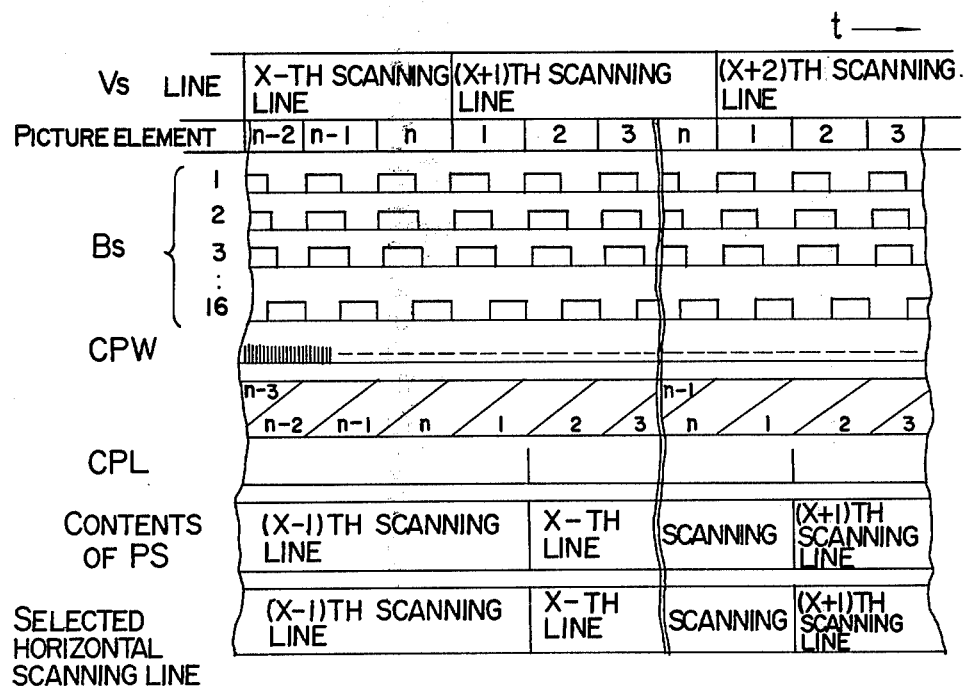

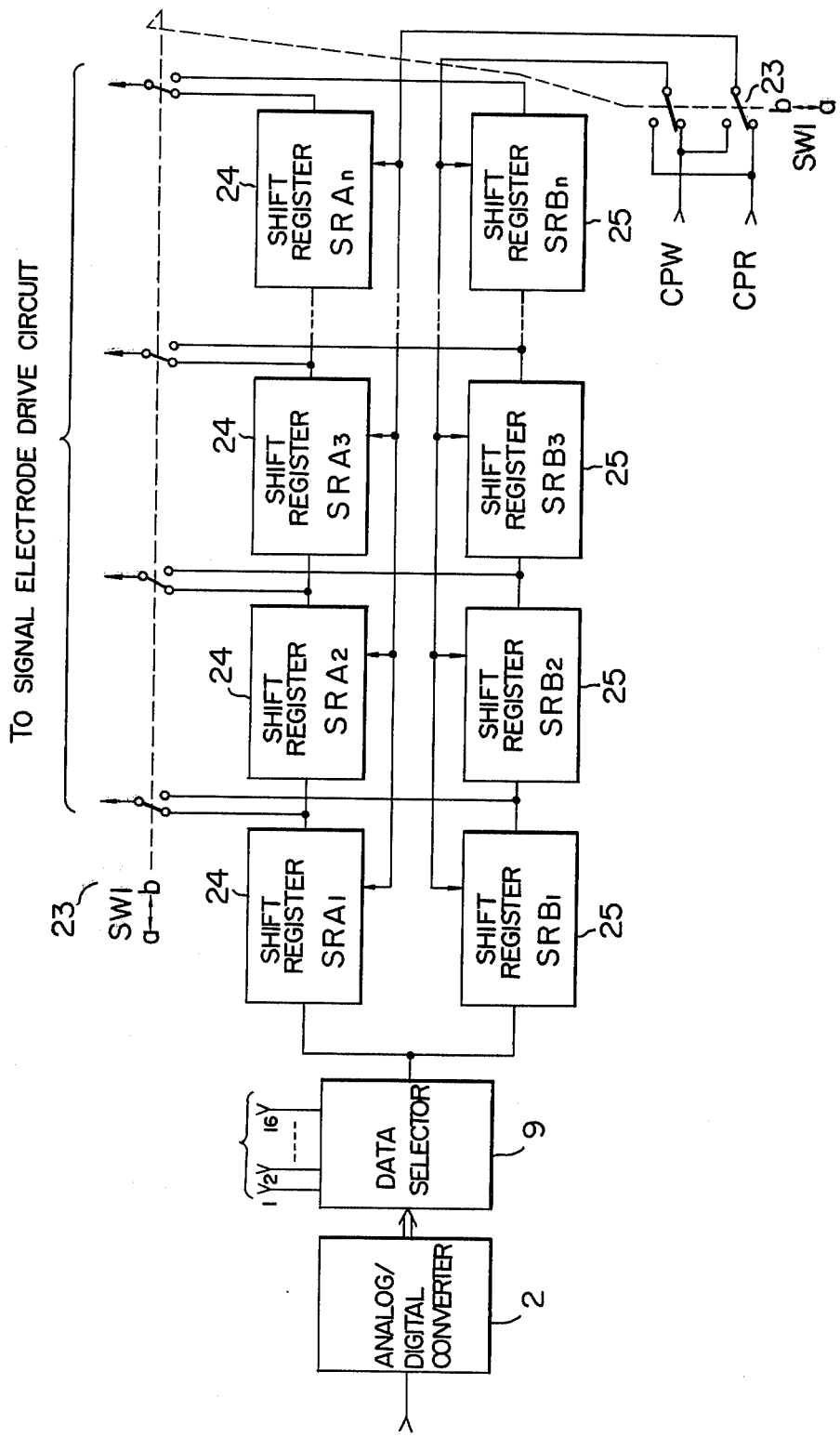

FIG.12

| VIDEO SIGNAL | LINE NO. | | x | | | x+1 | |
|---|---|---|---|---|---|---|---|
| | PICTURE ELEMENT NO. | n-2 | n-1 | n | 1 | 2 | 3 |

BRIGHTNESS SIGNALS 1, 2, 3, ... 16

| | | x | x+1 |
|---|---|---|---|
| CPW | | ⁞⁞⁞⁞⁞⁞⁞⁞— — — | — — — — — — |
| SW1 | | b | a |
| OPERATION OF SRAn | | SERIAL-PARALLEL CONVERSION | READOUT |
| OPERATION OF SRBn | | READOUT | SERIAL-PARALLEL CONVERSION |
| CLOCK SIGNAL TO SRAn | | CPW | CPR |
| CLOCK SIGNAL TO SRBn | | CPR | CPW |
| INPUT SIGNAL TO SR | n-2 | n-1 | n | 1 | 2 | 3 |
| REWRITING OF SR | | SRAn | SRBn |

FIG.13

CONTENTS OF SHIFT REGISTER
- HALFTONE LEVEL 1
- HALFTONE LEVEL 5
- HALFTONE LEVEL 16

FIG.14

CLOCK SIGNAL CPR

OUTPUT OF SHIFT REGISTER
- HALFTONE LEVEL 1
- HALFTONE LEVEL 5
- HALFTONE LEVEL 16

INDETERMINATE REGION EXCEPT "O" AND "1" SIGNALS

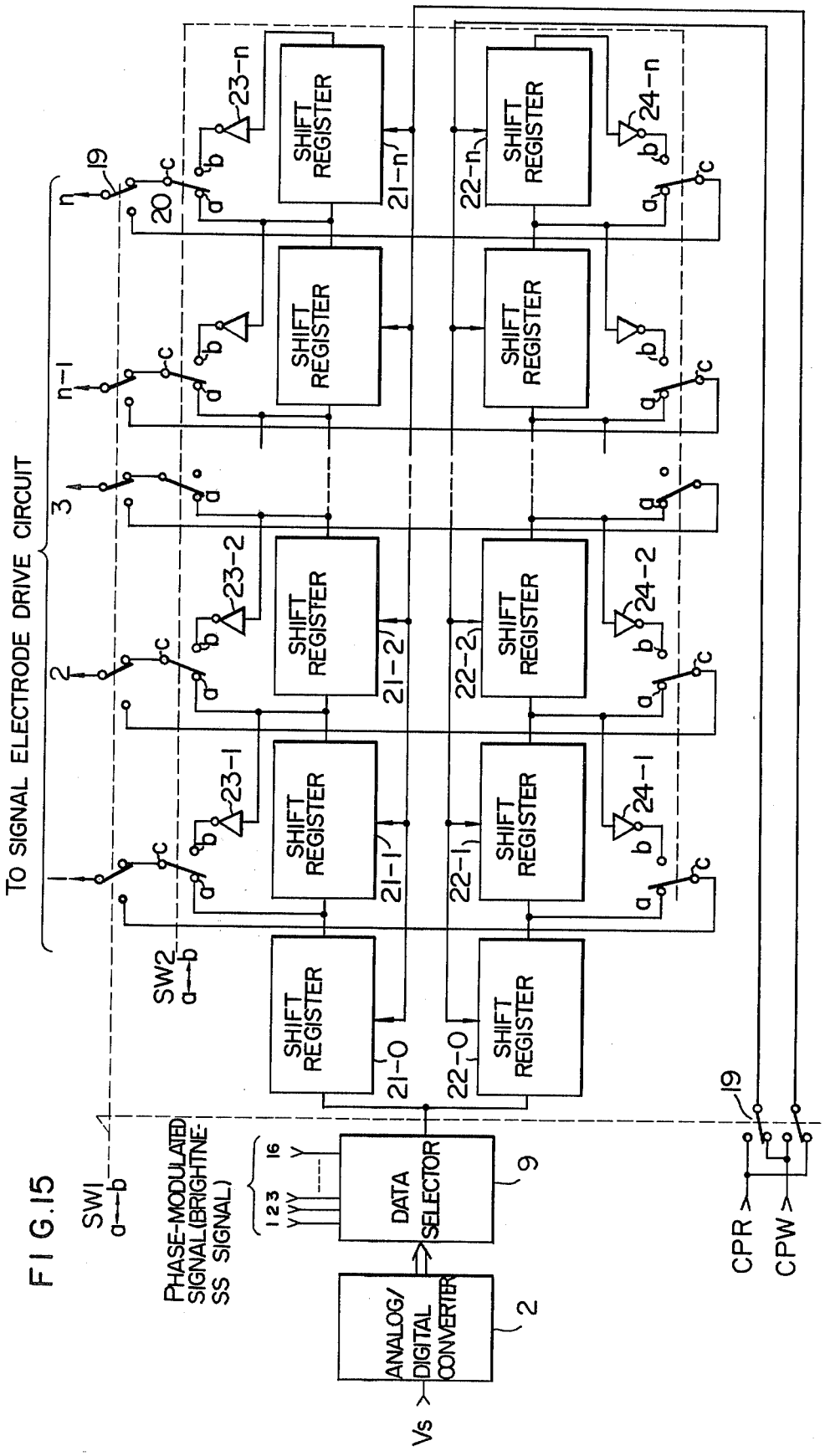

PHASE-MODULATED SIGNAL 1 |0|0|0|0|0|0|0|0|0|0|0|0|0|0|0|0|

PHASE-MODULATED SIGNAL 6 |0|0|0|0|0|0|0|0|0|0|1|1|1|1|1|1|

PHASE-MODULATED SIGNAL 16 |1|1|1|1|1|1|1|1|1|1|1|1|1|1|1|1|

LIQUID CRYSTAL DISPLAY DEVICE USING SIGNAL CONVERTER OF DIGITAL TYPE

LIST OF PRIOR ART REFERENCE (37 CFR 1.56 (a))

The following reference is cited to show the state of the art:

John A. van Raalte, "Matrix TV Displays Systems and Circuit Problems" IEEE Transactions on Consumer Electronics Vol. CE-21, No. 3, Aug. 1975, pp. 213-219

FIELD OF THE INVENTION

The present invention relates to a liquid crystal display device adapted especially for displaying halftone pictures.

A matrix panel, in which electrodes for liquid crystal display are arranged in matrix configuration, is used to display a desired pattern with liquid crystal picture elements located at intersections of rows of electrodes and columns of electrodes as disclosed in the prior art reference of John A. van Raalt, "Matrix TV Displays System and Circuit Problems". In the case of driving such a liquid crystal display panel, the socalled amplitude selection method is used in which display is performed by equalizing leakage voltages in the panel so as to prevent crosstalk caused by the electrically bidirectional property of the liquid crystal.

Even in the case of displaying halftone pictures, display is performed by the pulse width modulation method based on the amplitude selection method, to prevent crosstalk.

The pulse width modulation method based on the amplitude selection matrix addressing technique is disclosed in, for example, the specification of the U.S. Pat. No. 3,995,942, titled "Method of driving a matrix type liquid crystal display", the previous invention assigned to the Applicant.

BRIEF DESCRIPTION OF THE DRAWINGS

FIG. 4 shows waveforms used when a liquid crystal display panel is driven by the amplitude selection method.

FIG. 5 shows in block diagram a liquid crystal picture display device according to the present invention.

FIG. 9 shows waveforms of brightness control signals.

FIG. 10 shows a time chart for the operation of the signal converting circuit shown in FIG. 8.

FIG. 11 shows in block diagram a signal converting circuit as a second embodiment of the present invention.

FIG. 12 shows a time chart for the operation of the signal converting circuit shown in FIG. 11.

FIG. 13 shows the content of the shift register used in the circuit shown in FIG. 11.

FIG. 14 shows a time chart for the operation of the signal converting circuit shown in FIG. 11.

FIG. 15 shows a signal converting circuit as a third embodiment of the present invention.

DESCRIPTION OF THE PRIOR ART

Figure 1:
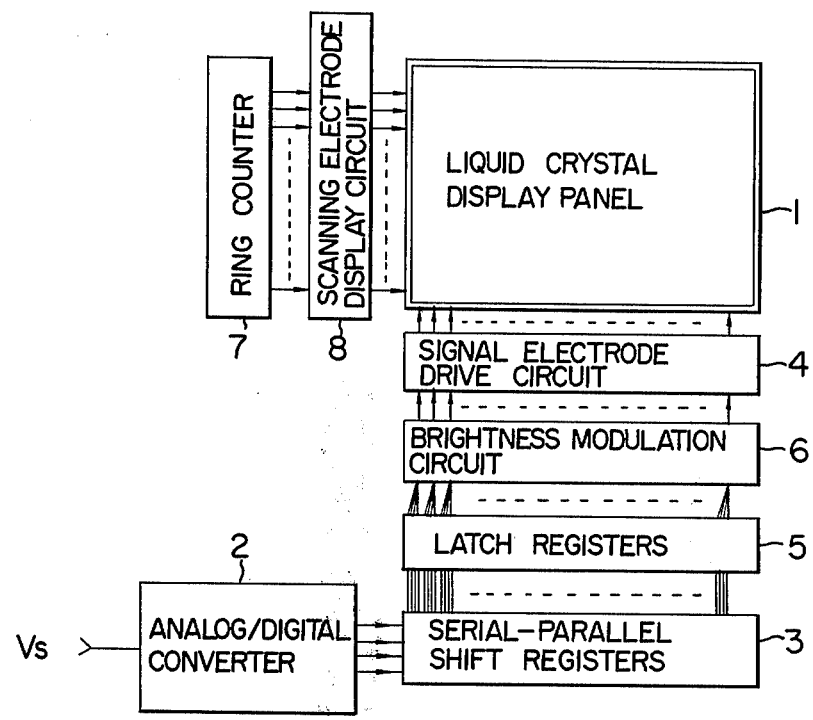
FIG. 1 is a block diagram of a conventional liquid crystal display device capable of displaying halftone pictures.

FIG. 1 is a block diagram of a conventional liquid crystal display device. The constitution and the operation of the liquid crystal display device shown in FIG. 1 will be explained before the description of the embodiments of the present invention for a better understanding of the present invention.

A video signal $V_s$ for displaying a picture on a liquid crystal display panel 1 is converted to a digital signal, i.e. binary 4-bit signal (or any other suitable one), by an A/D converter 2 and pieces of information just filling one horizontal line on the liquid crystal display panel 1 are sent to serial-parallel shift registers 3.

In the case where line-at-a-time scanning is used, as in the liquid crystal display panel 1, it is necessary to simultaneously supply pieces of information to fill a horizontal scanning line, as a control signal, to a signal electrode drive circuit 4 for energizing the columns of the panel 1 in a matrix configuration. Therefore, latch registers 5 are provided to transfer the brightness information in the serial-parallel registers 3 thereto. The information in the latch registers is transferred to a brightness modulation circuit 6. The brightness modulation circuit 6 converts the information in the latch registers 5 to a signal suitable as a control signal for the signal electrode drive circuit 4. The converted signal is then supplied to the signal electrode drive circuit 4.

Figure 2:
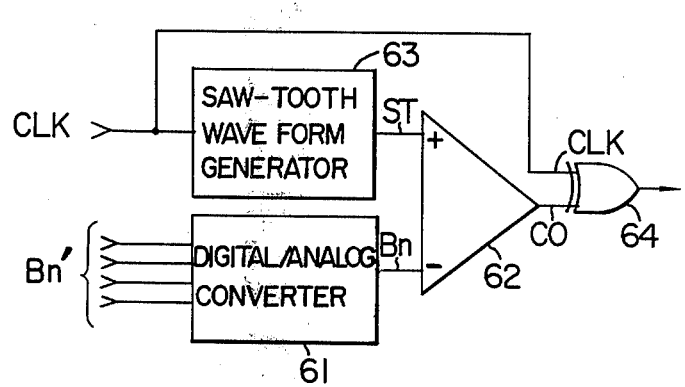
FIG. 2 shows in block diagram a conventional brightness modulation circuit.
Figure 3:
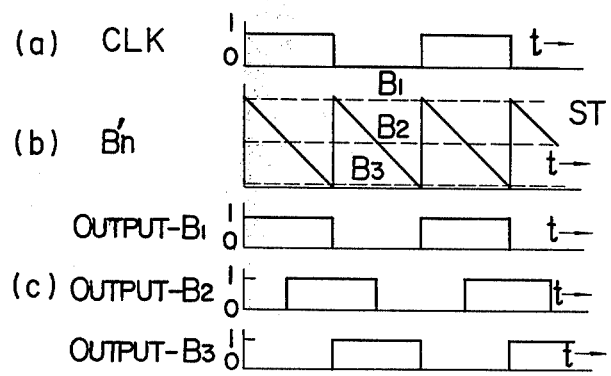
FIG. 3 shows waveforms useful in explaining the operation of the circuit shown in FIG. 2.

On the other hand, a ring counter 7 is used to horizontally scan the liquid crystal display panel 1, that is, to energize the rows of the matrix-type panel 1. The ring counter, having output terminals equal in number to the horizontal lines, i.e. rows, of the panel 1, serves to sequentially select the horizontal lines. The output signals of the ring counter 7 are sent to a scanning electrode drive circuit 8. The scanning electrode drive circuit 8, having its input and output terminals respectively equal in number to the output terminals of the ring counter 7 and therefore to the scanning electrodes of the liquid crystal display panel 1, generates a drive voltage applied to the panel 1 in response to the control signal from the ring counter 7. In this constitution as shown in FIG. 1, shift registers which receive inputs in series and delivers outputs in parallel, are used as the serial-parallel shift registers 3. The brightness modulation circuit 6 will next be described with the aid of FIGS. 2 and 3. FIG. 2 shows in block diagram the brightness modulation circuit 6 and FIG. 3 shows waveforms useful in explaining the operation of the circuit shown in FIG. 2. The digital signals (i.e. brightness signal B'n) from the latch registers 5 are again converted to an analog signal Bn by a D/A converter 61. The analog signal Bn is then sent to a comparator 62. Meanwhile, when such a clock signal CLK as shown in FIG. 3(a) is applied to a sawtooth waveform generator 63, a saw-tooth waveform signal ST shown in FIG. 3(b) is generated. The period of the clock signal CLK is twice as long as that of the saw-tooth signal ST.

The saw-tooth waveform signal ST is sent to one of the two inputs of the comparator 62. The comparator 62 compares the saw-tooth signal ST with the brightness signal Bn supplied to the other input thereof and delivers, as a result of the comparison, an output to one of the two outputs of a gate circuit 64. The gate circuit 64 is an exclusive-OR circuit (EOR) and receives at its remaining input the clock signal CLK. The gate circuit 64 delivers output signals ($B_1$, $B_2$ and $B_3$) having different phases in accordance with the levels of the brightness signal B'n, as shown in FIG. 3(c) Namely, the waveforms of the output signals are as shown in FIG. 4A.

Now, the way of driving the liquid crystal display panel 1 will be described with the aid of FIGS. 4A to 4D. A voltage having a waveform alternating stepwise between $+1/a\ V_o$ and $-1/a\ V_o$, as shown in FIG. 4B, is applied to the columns of the panel 1. This waveform has its phase changed in accordance with the video signal. The rows of the panel 1 are selected through the application thereto of a voltage having a waveform alternating stepwise between $+(1-1/a)\ V_o$ and $-(1-1/a)V_o$, as shown in FIG. 3C. This waveform has a fixed phase and therefore plays no active rate of controlling the tone of picture elements. The voltage difference of the signal shown in FIG. 4C from the signal shown in FIG. 4B, i.e. the voltage shown in FIG. 4D, is applied to the panel 1. The waveform shown in FIG. 4D has its effective value changed with the change in the phase of the voltage waveform shown in FIG. 4B so that the halftone level between black and white can be displayed. As seen from FIG. 4D, if the voltages applied to a pair of a column and a row have phases opposite to each other, the liquid crystal picture element at the intersection of the column and the row lights white, and the smaller is the phase difference, the less becomes the effective voltage, whereby the tone inclines toward black.

As apparent from the above description of the structure and the operation of the conventional liquid crystal display device, both the analog and the digital signals appear in the conventional device so that the overall circuit is complicated and the number of interconnections among the component circuits also is increased. Moreover, the coexistence of the analog and the digital signals makes it very difficult to construct the liquid crystal display device in a LSI configuration which has been strongly demanded recently to lead to the improvement in reliability and the reduction of cost.

SUMMARY OF THE INVENTION

A first object of the present invention is to provide a liquid crystal display device in which the brightness signal is completely digitalized and processed so as to eliminate the above-described drawback inherent to the connectional device.

A second object of the present invention is to provide a liquid crystal display device which is free from the above-described drawback of the conventional device and has a smaller number of interconnection.

A third object of the present invention is to provide a signal converting circuit which is free from the above-described drawback of the conventional device and which can have a smaller capacity when used as the above-described serial-parallel shift registers.

According to a first feature of the present invention, the brightness signal applied to the signal electrode drive circuit is a phase-modulated pulse signal and the brightness signal, after having passed the A/D converting circuit, is digitalized and processed so that the overall circuit can be simplified.

According to a second feature of the present invention, two shift register means for serial-parallel conversion are used and they are alternately subjected to writing and reading operations so that the number of interconnections can be decreased.

According to a third feature of the present invention, a plurality of N-bit shift registers are connected in cascade; a plurality of pairs each comprising an output terminal and an inverted-output terminal, e.g. the output terminal of the first shift register and the inverted-output terminal of the second shift register, the output terminal of the second shift register and the inverted-output terminal of the third shift register etc., are provided; and the output and the inverted output are alternately delivered by changing over the output terminal and the inverted-output terminal by a switch provided for each pair each time a shift register shifts its content by N bits, so that the capacity of each shift register can be decreased.

DETAILED DESCRIPTION OF THE DRAWINGS

FIG. 5 shows in block diagram the constitution of a liquid crystal display device embodying the present invention. The device comprises a ring counter 7, a scanning electrode drive circuit 8, a matrix type display panel 1, a control circuit 12, an analog/digital converter (referred to also as A/D converter) 2, a data selector 9, a brightness control signal generating circuit 10, a signal electrode drive circuit 4 and a serial-parallel converting circuit 11.

The matrix type display panel 1 includes two glass plates disposed near to and in register with each other and spaced several to ten and several microns apart from each other and liquid crystal filling the space between the glass plates.

Transparent electrodes in the form of parallel stripes are deposited on the glass plates through vacuum evaporation and the two glass plates are so registered with each other that the parallel electrodes on one plate are perpendicular to the parallel electrodes on the other. Therefore the portions of intersection serve as picture elements.

Figure 6:
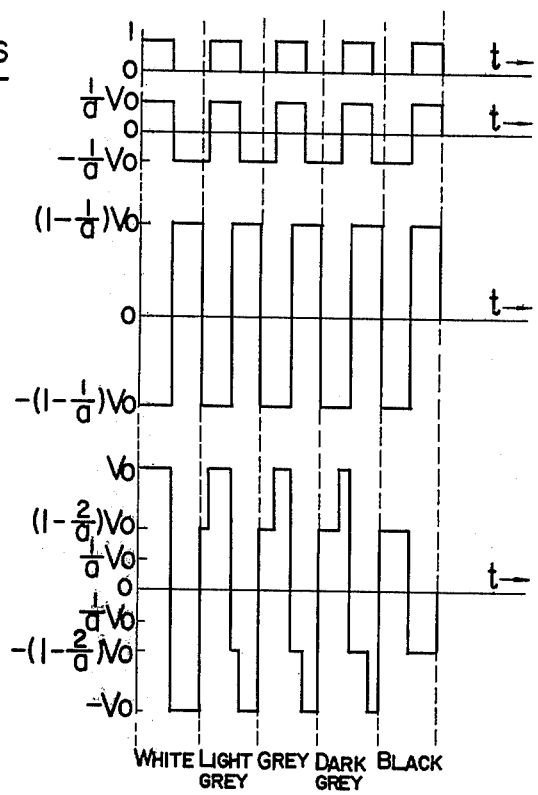
FIG. 6 shows the waveforms of the voltages for driving liquid crystals.

The liquid crystal used here is electrically bidirectional and it is preferable to use a drive method called the amplitude selection method. FIG. 6 shows the waveforms of drive voltages used to display halftone levels between black and white according to the amplitude selection method. The brightness control signals refers to the control signals to be applied to the signal electrode drive circuit. Upon reception of these signals, the signal electrode drive circuit delivers an output having such a waveform $V_Y$ as shown in FIG. 6. The scanning electrode drive circuit delivers a voltage having such a waveform $V_X$ as shown in FIG. 6. A voltage having a waveform $V_Y-V_X$ is therefore applied to the picture elements of the liquid crystal display panel 1. As shown in FIG. 6, the voltage waveform $V_Y-V_X$ has portions to give five different brightnesses, i.e. white, light grey, grey, dark grey and black, to the picture elements. The bias waveform refers to the waveform of the voltage applied to any picture element that is not selected, and is characteristic of the amplitude selection method.

Figure 7:
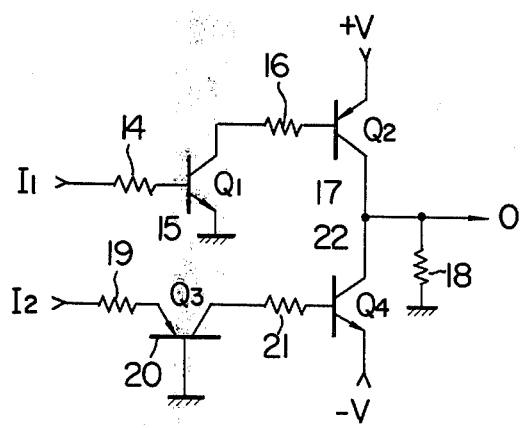
FIG. 7 shows an example of a signal electrode drive circuit used in the liquid crystal picture display device shown in FIG. 5.

FIG. 7 shows a concrete example of a circuit for generating the waveforms $V_X$ and $V_Y$ shown in FIG. 6. In FIG. 7, voltages $+1/aV_o$ and $-1/aV_o$ are applied respectively to terminals $+V$ and $-V$ in the case of the signal electrode drive circuit while voltages $+(1-1/a)V_o$ and $-(1-1/a)V_o$ are applied respectively to the terminals $+V$ and $-V$ in the case of the scanning electrode drive circuit. Here, a is related to the number N of the scanning lines in such a manner that $a=\sqrt{N}+1$. When input terminals $I_1$ and $I_2$ are respectively at levels "1" and "0", transistors $Q_1$ and $Q_2$ are turned on and transistors $Q_3$ and $Q_4$ are turned off so that a voltage $+V$ appears at an output terminal 0. When the input terminal $I_1$ and $I_2$ are respectively at levels "0" and "1", the transistors $Q_1$ and $Q_2$ are turned off and the transistors $Q_3$ and $Q_4$ are turned on so that a voltage $-V$ appears at the output terminal 0. If the input terminals $I_1$ and $I_2$ are both at the level "0", the transistors $Q_1$-$Q_4$ are all turned off so that a voltage of 0V appears at the output terminal 0. Therefore, the drive circuit shown in FIG. 7 can be used as both the signal electrode drive circuit 4 and the scanning electrode drive circuit 8 in FIG. 5.

The liquid crystal display panel 1 is scanned with the line-at-a-time system and therefore the control signals to be applied to the scanning electrode drive circuit 8 can be obtained from a ring counter constituted of logic elements. Namely, the scanning electrode drive circuit 8 delivers output voltages $\pm(1-1/a)V_o$ only at the selected output terminals and a zero voltage at the non-selected output terminals. And each time the ring counter 7 receives a control signal, the scanning electrodes are energized one by one to complete a line-at-a-time scanning over the display panel 1.

As seen from FIG. 6, halftone pictures can be displayed by changing the phase of the output signal of the signal electrode drive circuit 4. Further, since the drive circuit shown in FIG. 7 is a mere level shifter, the display of the halftone pictures is possible by simply changing the phase of the control signal (brightness control signal) applied to the signal electrode drive circuit 4, as shown in FIG. 6.

Figure 8:
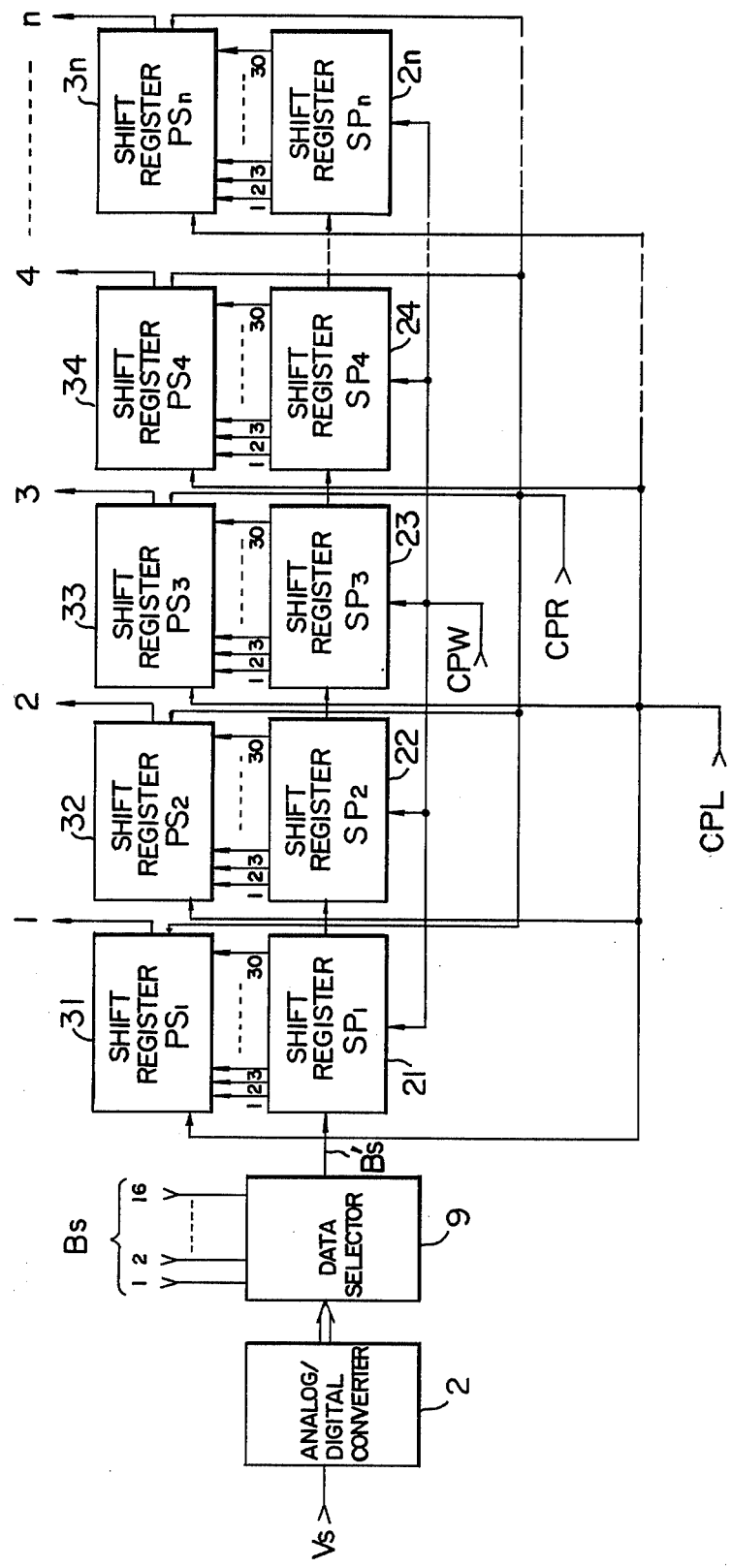
FIG. 8 shows in block diagram a signal converting circuit as a first embodiment of the present invention.

FIG. 8 is a block diagram of a signal converting circuit as a first embodiment of the present invention. This circuit is adapted for a display panel 1 having n signal electrodes and being capable of displaying 16 halftone levels.

An A/D converter 2 for delivering binary 4-bit outputs receives a video signal $V_s$ and the video signal $V_s$ is converted to digital signals in accordance with the brightness level signals. The A/D converter 2, having n signal electrodes, performs n times of signal conversion per an entire horizontal scanning line. If m scanning electrodes are provided on the display panel, the A/D converter 2 performs m×n converting operations per an entire scanning of the panel 1.

The output of the A/D converter 2 for delivering binary 4-bit outputs is used as an address signal of a data selector 9 which also receives the brightness control signal $B_S$ consisting of 16 phasemodulation signals. The data selector 9 therefore selectively delivers at its output terminal the brightness control signal $B_S$ in accordance with the brightness levels.

FIG. 9 illustrates the brightness control signal $B_S$ applied to the data selector 9. The brightness control signal $B_S$ is composed of 16 components which correspond to 16 halftone levels. The A/D converter 2 to send outputs to the data selector 9 must have a resolution of at least 1/16 to display 16 halftone levels. The output signal (address signal) of the data selector 9 is supplied to a shift register means. The shift register means includes n shift registers having the same constitution, connected in cascade. The number n of these shift registers 21–2n (with serial inputs and parallel outputs) is equal to the number of the signal electrodes, i.e. the second group of scanning electrodes, of the liquid crystal panel 1.

Each of the shift registers 21–2n has a capacity of 30 bits (since one period of the brightness control signal $B_S$ covers 30 pulses).

Since the 30 pulses of a clock signal CPW are supplied as clock signals to the shift registers 21–2n during one period of the brightness control signal $B_S$ as shown in FIG. 9, the brightness control signal $B_S$ is divided into 30 portions each in the form of "1" or "0", which are stored in one of the shift registers 21–2n.

Also, since the brightness control signal $B_S$ is supplied n times to the data selector 9 during one horizontal scanning period, the shift registers 21–2n store the brightness levels, i.e. 30 portions of the brightness control signal $B_S$, for the n picture elements on a selected scanning electrode. When the storing of the brightness information for a selected scanning electrode into the shift registers 21–2n is completed, the contents of the registers 21–2n are transferred to shift registers 31–3n in response to a clock signal CPL. The shift registers 31–3n are of parallel-input/serial-output configuration.

When the brightness information to fill a horizontal scanning line, i.e. n pieces of brightness information, has been stored in the shift registers 31–3n, a clock signal CPR is supplied to the shift registers 31–3n to cause the contents of the registers to be delivered to the signal electrode drive circuit 4. Accordingly, the brightness control signal $B_S$ whose portions are in accordance with the brightness levels at the respective picture elements on one horizontal line of the liquid crystal display panel 1, can be obtained. Namely, the brightness control signal $B_S$ serves as a drive signal for the signal electrode drive circuit 4 so that the display on one horizontal line of the panel 1 takes place. Moreover, during this period, the shift registers 21–2n stores the brightness control signal $B_S$ for the next horizontal line. It is therefore apparent from the above description that the time required for the information for one scanning electrode to be stored in the shift registers 21–2n, is equal to the time required for one horizontal line of the liquid crystal display panel 1 to complete displaying.

FIG. 10 concretely illustrates how the liquid crystal display panel 1 is scanned. The brightness control signals $B_S$ are successively selected in accordance with the video signal and the resultant brightness control signals $B_S$ are sequentially registered in shift registers SP's. As soon as the signals to be applied to the n picture elements (on one horizontal line) have been stored in the shift registers SP's, a clock signal CPR is sent to the shift registers PS's to start scanning. In like manner, the successive lines are scanned.

As is apparent from the above description, according to the present invention there is used only one brightness modulation circuit constituted of a brightness control signal generating circuit consisting of a group of shift registers and a data selector (having 16 channels) whereas according to the prior art every signal electrode must be provided with such a brightness modulation circuit. In addition, according to the present invention, the serial-parallel converting circuit and the latch register can be constructed of shift registers alone. Therefore, the present circuit can be more simplified in circuit configuration and more adapted for integrated circuit than the conventional circuit.

The embodiments of the present invention are limited to the case where the A/D converter delivers an output of binary 4-bit signal and 16 halftone levels are displayed. However, the present invention is by no means limited to those embodiments but can be applied to numerous other cases.

Therefore, the liquid crystal display device capable of displaying halftone pictures, embodying the present invention, whose component circuits except the A/D converter are constructed by digital circuits, has advantages that it is well adapted for IC configuration and that every signal electrode need not be provided with a brightness modulation circuit.

FIG. 11 is a block diagram of a signal converting circuit as a second embodiment of the present invention. The second embodiment will be described below. The video signal is analog and since the display device is so designed as to treat digital signals alone, the video signal must be converted to digital one by an A/D converter 2. The video signal in digital form is used as an address signal to a data selector 9. The data selector 9 also receives such a brightness control signal as shown in FIG. 9 sent from the brightness control signal generating circuit 10 shown in FIG. 5. Accordingly, the data selector 9 delivers brightness control signals corresponding to the brightness levels at the picture elements on the display panel in dot-sequential manner.

The selected brightness control signals are sent as inputs to shift registers 24 and 25. At this time, clock pulses CPW for writing is applied to the shift registers for serial-parallel conversion in synchronism with the brightness control signal through the switching of a switch 23 so that the brightness control signals are transferred to the shift registers (SRB$_1$-SRB$_n$ and SRA$_1$-SRA$_n$).

The above operation is performed on each of the picture elements at one scanning electrode and all the contents of the shift registers performing the conversion operation are rewritten. For example, in the case where the shift registers SRA$_n$ (n=1, 2, 3, .....) perform write-in operation, the brightness control signal for each signal electrode need to be formed of 30 bits of information to display 16 halftone levels. Accordingly, 30×n write-in clock pulses CPW are applied to the shift registers SRA1-SRAn and all the contents of the shift registers SRA1-SRAn are renewed. When the rewriting operation is finished, the switch 23 is changed over to the side a. Then, 30 readout clock pulses CPR are applied simultaneously to the shift registers SRA1-SRAn during the time for which the brightness control signals for a single scanning electrode are selected, so that the contents, i.e. the brightness control signals as shown in FIG. 9, of the shift registers SRA1-SRAn are delivered at the output terminal. Since the switch 23 rests on the side a, the brightness control signals delivered from the registers SRA1-SRAn are also applied as control signals to the signal electrode drive circuit.

FIG. 12 is a time chart for explaining the writing of the brightness control signals into the shift registers (SRA1-SRAn and SRB1-SRBn) with the waveforms of several signals. In this figure, the case is shown where the brightness control signals for the (n-2)th, (n-1)th and n-th picture elements on the x-th scanning line and for the 1st, 2nd and 3rd picture elements on the (x+1)th scanning line are written in the shift registers (SRA1-SRAn and SRB1-SRBn). The brightness control signals are repeatedly applied to the data selector 9 at a period equal to the time required for a single picture element to be selected. The data selector 9 delivers the brightness control signals corresponding to the brightness levels for the respective picture elements. When the x-th line is scanned, the switch 23 rests on the side a while when the (x+1)th line is scanned the switch 23 is changed over to the side b. Accordingly, the write-in clock signal CPW is applied to the shift registers (SRB1-SRBn) for the scanning of the x-th line and to the shift registers (SRA1-SRAn) for the scanning of the (x+1)th line so that the brightness control signals corresponding to the brightness levels at the respective picture elements on the x-th line are registered in the registers (SRB1-SRBn) while the brightness control signals corresponding to the brightness levels at the picture elements on the (x+1)th line are registered in the registers (SRA1-SRAn). Similarly, the brightness control signals for the (x+2)th and (x+3)th lines are stored respectively in the shift registers (SRB1-SRBn) and in the shift registers (SRA1-SRAn). Therefore, the switch 23 is changed over each time a new line is selected to be scanned. A switch 23 through which digital signals are passed, may be constituted of logic gates.

FIG. 13 shows the contents of shift registers in case respectively of 1, 5 and 16 halftone levels. As seen in FIG. 13, each shift register stores the 30-divided portions of the brightness control signals shown in FIG. 9 in the form of "0" or "1" level. Accordingly, the shift registers deliver the brightness control signals when receiving 30 readout clock pulses CPR, as shown in FIG. 14. The brightness control signals are simultaneously supplied to the signal electrode drive circuit.

It is clear from the above description with the liquid crystal display device of line-at-a-time scanning type that if the two groups (A and B) of shift registers (SRA1-SRAn) and (SRB1-SRBn) are used and if the registers of the B group deliver the brightness control signals to the signal electrode drive circuit when the registers of the A group are performing write-in operation and vice versa, then the serial-parallel conversion of the brightness control signals can be effected.

Now, description will be made of the frequencies of the clock signals CPW and CPR in the case of picture display on a matrix type liquid crystal display panel with 100×100 picture elements, using television broadcasting signals.

In NTSC television broadcasting system, the time required for a single horizontal scanning is about 63.5 μsec. It is therefore necessary to write in the shift registers the brightness control signals for all the picture elements on one scanning electrode of the liquid crystal display panel 1 during that period. In this case, each shift register has a capacity of 3000 bits since 30 bits are allotted to each signal electrode. In order to write the data of 3000 bits in the registers for 63.5 μsec., therefore, the frequency of the write-in clock pulse signal CPW must be nearly 47.25 MHz. On the other hand, in the readout operation, it is necessary to apply 30 pulses to each register for 63.5 μsec. so that the frequency of the readout clock signal CPR should be about 472.5 KHz.

These clock signals are generated by the control circuit 8 shown in FIG. 5 and may also be generated by a quartz oscillator or an oscillation circuit using resistors and capacitors as oscillating elements. Moreover, today's electronic technique can derive such clock signals from the synchronous signal of the commercial television broadcasting signal through the use of a phase locked loop (PLL). In that case, the horizontal synchronizing signal is used as a reference and frequency dividing circuits having dividing ratios of 1/3000 and 1/30 are used respectively for the write-in and readout clock signals CPW and CPR.

The phase modulation signal generated by the brightness control signal generating circuit 10 is a digital signal having "0" and "1" levels and therefore may be easily generated also by logic elements.

As described above, while with the drive circuit of the first embodiment a great number of interconnections are used to connect between the shift registers for the serial-parallel conversion of the brightness signals and the latch registers, only two such interconnections are used per a signal electrode, with the drive circuit according to the present invention. Thus, the present invention can lead to a considerable reduction of the number of the interconnections and therefore provide a drive circuit for a liquid crystal display device, adapted for IC configuration.

Figures 16, 17:
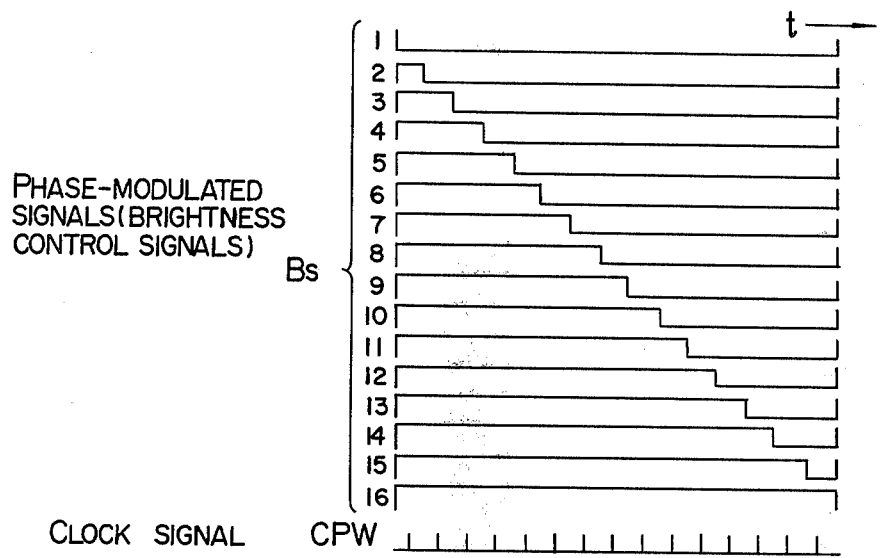
FIG. 16 shows a time chart for pulse width modulation signals applied to the signal converting circuit shown in FIG. 15.
FIG. 17 shows the content of the shift register used in the circuit shown in FIG. 15.

FIG. 15 is a block diagram of a signal converting circuit as a third embodiment of the present invention. This third embodiment will be described below. The input brightness signals are pulse width-modulated signals each having a period extending over 15 clock pulses CPW as shown in FIG. 16 and each shift register has a capacity of 15 bits. In FIG. 15, a serial-parallel converter comprises shift registers 21-0–21-n and 22-0–22-n, inverters 23-1–23-n and 24-1–24-n, a switches 19 and 20. The shift registers, each having a capacity of 15 bits, are cascaded in two rows as shown in FIG. 15. The outputs of the shift registers 21-0–21-(n-1) are connected with the associated output terminals a while the output of the shift registers 21-1–21-n are connected through the respective inverters 23-1–23-n with the associated inverted output terminals b. The switch 20 causes the respective moving contacts connected with the converter output terminals c to be switched over between the stationary contacts connected with the output terminal a of the shift register 21-0 and the inverted output terminal b of the shift register 21-1, between the stationary contacts connected with the output terminal a of the shift register 21-1 and the inverted output terminal b of the shift register 21-2, etc.

The shift registers 22-0–22-n are also wired in a similar manner.

The purpose of arranging the shift registers in two rows is to use the rows as a serial-parallel converter and latch registers alternately. For example, while the shift registers 21-0–21-n are performing a serial-parallel converting (i.e. write-in) operation, the shift registers 22-0–22-n perform a latching (readout) operation and while the shift registers 21-0–21-n are latching (readout), the shift registers 22-0–22-n are at the serial-parallel conversion (write-in). The switching-over between serial-parallel conversion and latching is performed by the switches 19, which also perform change-over between write-in clock signal CPW and readout clock signal CPR. As described above, the shift registers in both the rows perform the same operation, only staggered with time, and therefore it will suffice to describe the operation of the registers belonging to one of the rows.

The video signal is converted to a digital signal through an A/D converter 2 and the digital signal is applied as an address signal to a data selector 9 so as to select one of the 16 phase-modulated signals as brightness signals. As the phase-modulated signals are used, such signals as shown in FIG. 16, which can easily be generated by a well-known electronic means such as, for example, a combination of logic elements.

As shown in FIG. 16, 15 pulses synchronous with the phase-modulated signals are used as write-in clock signals, which are applied to the row of registers ready for writing operation through the switches 19. As regards the shift registers at the writing operation, therefore, the 15 bits are all "0" in the shift register storing the phase-modulated signal 1; the 5 bits are "1" and the 10 bits are "0", in the shift register storing the phase-modulated signal 6; and the 15 bits are all "1" in the shift register storing the phase-modulated signal 16. These conditions are shown in FIG. 17.

Accordingly, the phase-modulated signals for the picture elements on a single scanning electrode are transferred to the shift registers at writing operation in the serial-parallel converter. The number of the shift registers in each row is larger by unity than that of the picture elements an each scanning electrode and the content of the (n+1)th register is superfluous but since it has no influence upon display, no undesired problem arises.

Figures 18, 19:
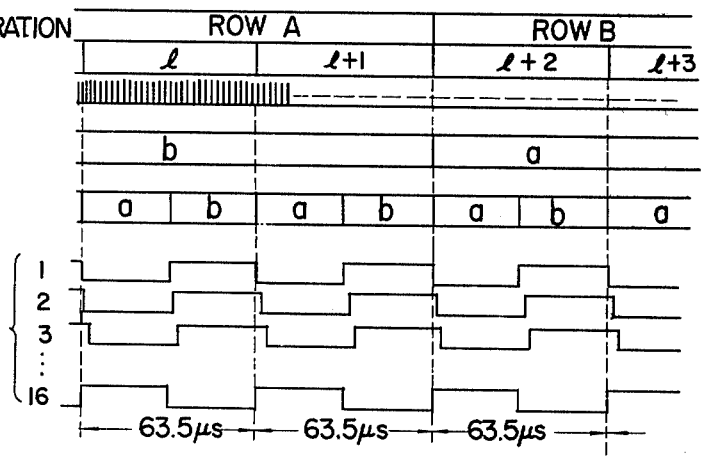
FIG. 18 shows a time chart for the write operation of the signal converting circuit shown in FIG. 15.
FIG. 19 shows a time chart for the read operation of the circuit shown in FIG. 15.

In this way, after the registers of one row have completed write-in operation, they move to readout operation and then the registers of the other row move to write-in operation. FIG. 18 shows a time chart for write-in operation. The phase-modulated signals are repeatedly supplied to the data selector 9 each time the A/D conversion operation takes place. The clock signal CPW is also applied to the shift registers at write-in operation in synchronism with the repeated application of the phase-modulated signals. The frequency of the clock signal CPW is determined depending on the number of the signal electrodes used in the display panel and the number of halftone levels to be displayed. For example, in the case where the commercial television broadcasting signal is used as the video signal for the liquid crystal display device, the brightness signals (phase-modulated signals) for all the picture elements on a single scanning electrode must be stored in the shift registers for a horizontal scanning period 63.5 μsec. and therefore the frequency should preferably be 23.625 MHz if 100 signal electrodes are used, the signals shown in FIG. 16 are used as the phase-modulated signals and 16 halftone levels are to be displayed.

By means of the switches 19, the clock signals CPW are applied only to the shift registers which have been ready for writing.

The reading operation will now be described. At the time of reading, the shift registers are disconnected from the data selector 9 by means of the switches 19 and the write clock signal CPW is replaced by the read clock signal CPR. The 30 pulses of the read clock signal CPR are applied to the shift registers at reading operation. Simultaneously, the switches 20 select the output terminals a during the application of the earlier 15 pulses of the 30 readout clock pulses CPR and then the invented output terminals b during the application of the later 15 pulses.

Accordingly, the signal electrode drive circuit connected with the converter output terminals c receives the signals from the output terminals a of the shift registers for the earlier 15 pulses of the readout clock signal CPR and the signals from the inverted output terminals b of the shift registers for the later 15 pulses of the readout clock signal CPR. FIG. 19 shows a time chart for the phase-modulated signal 6. As seen from FIG. 19, it is possible to obtain such pulse phase-modulated signal having a duty ratio of 50:50 as shown in FIG. 9 if such signals as shown in FIG. 16 are used. All the other phase-modulated signals can also be subjected to the serial-parallel conversion in the same manner. Moreover, since this conversion operation takes place simultaneously for all the signal electrodes, the circuit shown in FIG. 15 can perform the latching and serial-parallel conversion of the phase-modulated signals having a duty ratio of 50:50.

The frequency of the readout clock signal CPR should preferably be 472.5 KHz since 30 pulses must be processed for 63.5 μsec.

As described above, by the application of the present invention to the drive circuit of a liquid crystal display device, the memory capacity of the shift registers used in the serial-parallel converter playing a major role in a liquid crystal display device capable of displaying halftone pictures can be halved in comparison with the conventional device. Thus, the present invention may claim to have a considerable merit since a great number of shift registers must be used in such a serial-parallel converter.

I claim:

1. A liquid crystal display device for displaying a video signal, comprising:
   (a) a liquid crystal display panel in which liquid crystal picture elements are located at intersections of plural rows of scanning electrodes and plural columns of signal electrodes arranged in a matrix configuration, the transmissivity of said liquid crystal picture elements being selectively controlled when the associated scanning and signal electrodes are energized;
   (b) a control circuit for generating a first, a second, and a third clock signal;
   (c) ring counter means for producing a scanning signal in response to said first clock signal;
   (d) means for energizing selected ones of said scanning electrodes in response to said scanning signal;
   (e) a signal electrode drive circuit including a plurality of drivers, each of said drivers being connected to one of said electrodes for energizing the same; and
   (f) a signal converting circuit including:
      an analog-to-digital converter for converting a video signal to be displayed for one horizontal period into a plurality of time-serial binary-coded signals each corresponding to an amplitude of a corresponding part of said video signal;
      means for converting said plurality of time-serial binary-coded signals into a plurality of time-serial pulse trains in accordance with said second clock signal, each train including a number of pulses determined by the corresponding binary-coded signal;
      a plurality of first shift registers connected in series for storing said plurality of time-serial pulse trains; and
      a plurality of second shift registers, each first shift register being connected to one of said second shift registers, for storing the contents of said first shift registers at a time in response to said first clock signal and, each of said second shift registers being connected to one of said drivers correspondingly and respectively, for supplying said time-serial pulse trains to the same in accordance with said third clock signal.

2. A liquid crystal display device for displaying a video signal, comprising:
   (a) a liquid crystal display panel in which liquid crystal picture elements are located at intersections of plural rows of scanning electrodes and plural columns of signal electrodes arranged in a matrix configuration, the transmissivity of said liquid crystal picture elements being selectively controlled when the associated scanning and signal electrodes are energized;
   (b) a control circuit for generating a first, a second, and a third clock signal;
   (c) ring counter means for producing a scanning signal in response to said first clock signal;
   (d) means for energizing selected ones of said scanning electrodes in response to said scanning signal;
   (e) a signal electrode drive circuit including a plurality of drivers, each of said drivers being connected to one of said electrodes for energizing the same; and
   (f) a signal converting circuit including:
      an analog-to-digital converter for converting a video signal to be displayed for one horizontal period into a plurality of time-serial binary-coded signals each corresponding to an amplitude of a corresponding part of said video signal;
      means for converting said plurality of time-serial binary-coded signals into a plurality of time-serial pulse trains in accordance with said second clock signal, each train including a number of pulses determined by the corresponding binary-coded signal;
      a plurality of first shift registers connected in series and coupled to selectively receive a plurality of time-serial pulse trains from said converting means;
      a plurality of second shift registers connected in series and being coupled to selectively receive a plurality of time-serial pulse trains from said converting means; and
      changeover switch means, coupled to said pluralities of first and second shift registers, for alternately coupling said second clock signal thereto, and thereby alternately causing the storage of successive pluralities of time-serial pulse trains into said pluralities of first and second shift registers, respectively, and for alternately coupling said third clock signal thereto, and thereby alternately causing the contents of said pluralities of said second and first shift registers, respectively, to be applied to corresponding ones of the plurality of drivers of said signal electrode drive circuit.

3. A liquid crystal display device for displaying a video signal, comprising:

(a) a liquid crystal display panel in which liquid crystal picture elements are located at intersections of plural rows of scanning electrodes and plural columns of n signal electrodes arranged in a matrix configuration, the transmissivity of said liquid crystal picture elements being selectively controlled when the associated scanning and signal electrodes are energized;
(b) a control circuit for generating a first, a second, and a third clock signal;
(c) ring counter means for producing a scanning signal in response to said first clock signal;
(d) means for energizing selected ones of said scanning electrodes in response to said scanning signal;
(e) a signal electrode drive circuit including a plurality of drivers, each of said drivers being connected to one of said electrodes for energizing the same; and
(f) a signal converting circuit including:
  an analog-to-digital converter for converting a video signal to be displayed for one horizontal period into a plurality of time-serial binary-coded signals each corresponding to an amplitude of a corresponding part of said video signal;
  means for converting said plurality of time-serial binary-coded signals into a plurality of time-serial pulse trains in accordance with said second clock signal, each train including a number of pulses determined by the corresponding binary-coded signal;
  a plurality (n+1) of first shift registers connected in series, each having a capacity of N bits and being coupled to selectively receive a plurality of time-serial pulse trains from said converting means;
  a plurality (n+1) of second shift registers connected in series, each having a capacity of N bits and being coupled to selectively receive a plurality of time-serial pulse trains from said converting means;
  a plurality n of first output terminals;
  a plurality n of second output terminals;
  a plurality n of first inverters coupled to the outputs of the second to (n+1)th first shift registers;
  a plurality n of second inverters coupled to the outputs of the second to (n+1)th second shift registers;
  first changeover switch means, coupled to said pluralities of first and second output terminals and said pluralities of first and second shift registers, for alternately connecting the output of the k-th shift register and the output of the (k+1)-th shift register to each of said first and second pluralities of shift registers to the k-th output terminal of said pluralities of first and second output terminals, respectively, each time the contents of said pluralities of shift registers are shifted by N bits, K being 1, 2, 3, ... n+1; and
  second changeover switch means, coupled to said pluralities of first and second output terminals, for alternately connecting the n output terminals of said pluralities of first and second output terminals, to corresponding ones of the plurality of drivers of said signal electrode drive circuit, in response to said third clock signal.

* * * * *